Figure 1:
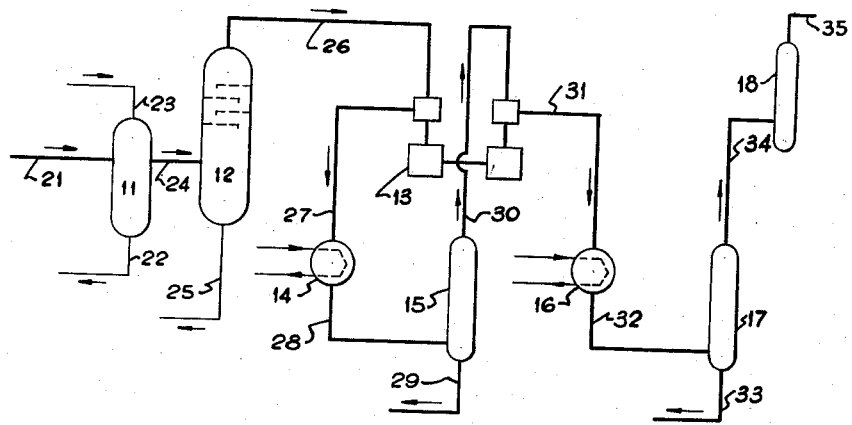

United States Patent Office 2,817,961
Patented Dec. 31, 1957

2,817,961

ETHYLENE RECOVERY

Harry E. O'Connell, Baton Rouge, La., assignor to Ethyl Corporation, New York, N. Y., a corporation of Delaware Application August 9, 1954, Serial No. 448,420

1 Claim. (Cl. 62—175.5)

INTRODUCTION

This invention relates to the manufacture of ethylene. More specifically, the invention relates to an improvement in the purification of and recovery of ethylene from a crude stream including as impurities higher molecular weight hydrocarbons and water vapor.

GENERAL BACKGROUND

Ethylene is one of the most important organic chemical feed materials. This light hydrocarbon is considered one of the most important "building blocks" in the synthesis of a wide variety of valuable organic materials. Its production, particularly from petroleum derived gaseous hydrocarbons, has enormously increased in the last decade. Among the products in which the ethylene is used for a starting material are ethyl chloride, ethylene cyanohydrin, ethylene chlorohydrin, ethylene oxide, ethylene glycol, acrylonitrile, and dichloroethane. The economically efficient production of ethylene, preferably in a relatively pure state, is of great importance.

PROBLEM

In the recovery of a relatively concentrated ethylene product from a crude stream, considerable difficulty has heretofore been encountered, particularly with respect to service factor of operating installations. Ethylene is predominantly made by the thermal cracking—dehydrogenation of a low molecular weight gaseous hydrocarbon stream. This pyrolysis of an ethane-propane feed material results in a cracked gas which has, for example 20 to 40 mole percent ethylene, plus a number of other compounds as impurities. The cracked gas is generally immediately quenched, upon leaving the cracking furnace, with a water spray. This assures that undesired side reactions are minimized, and reduces the gas temperature to a moderate level. The quenching results in the saturation of the gas with water vapor, and water vapor component presents a separation problem in later operations. Usually, the quenched gas is passed to a knock-out drum or disengager, but this unit removes only entrained liquid droplets.

In the cracking step, though the desired reaction is formation of ethylene a substantial and concurrent reaction is the formation of appreciable quantities of alkane, alkene, or aromatic hydrocarbons of greater molecular weight. In addition, appreciable quantities of methane are released. Illustrative of the formation of higher molecular weight materials, in a typical ethane cracking operation the cracked effluent includes about one-sixth, on a mole fraction basis, of such components. With the water vapor these impurities amount to about one-fifth of the crude stream. This portion includes, roughly 46 mole percent propylene, 13 mole percent propane, 9.5 percent butanes-butenes, 5 percent pentane and roughly 16 percent aromatic components, these including benzene, toluene, and trimethylbenzene. In addition, because of the aqueous vapor saturation already mentioned, this fraction includes about 10 percent water vapor. The other portion of four-fifths of the crude stream includes ethane and ethylene and lighter or lower molecular weight components, especially methane. The concentration of the ethylene in the overall stream is of the order of one-fourth to about three-tenths on a mole fraction basis.

The presence of the above described higher molecular weight hydrocarbons and water vapor in the crude ethylene, introduces parallel and related problems. Certain of the impurities are not harmful in themselves with respect to ethylene recovery. However, included in the above described fraction are minute quantities of unsaturated and polymerizable compounds. Thus, isobutene, n-butene, isoprene, and butadiene have all been well recognized as trace components present in this fraction although not enumerated in the foregoing descriptions. These impurities are disadvantageous with respect to the fractionation operations, as subsequently described. They are also very undesirable contaminants with respect to ethylene consuming operations. The water vapor must also be removed, not only because of ethylene quality requirements, but because it also has an adverse effect on fractionation. The water vapor at high pressures and low temperatures results in hydrate formations which can cause plugging of lines and fractionating column bubble caps. Accordingly, a dehydrating step is necessarily involved in the separation operation.

Certain fractionating steps in the recovery employ pressures of the order of 500–600 pounds (pounds, as used herein refers to pounds per square inch, gauge). In raising the pressure of the crude stream to these levels, usually a plurality of compression steps are employed. The gas is customarily cooled between the steps to remove the enthalpy of compression. Excessive intercooling has always been avoided because any liquid condensate formed is usually discarded and it was thought that further cooling would thus result in appreciable ethylene losses. Accordingly, a large amount of the undesired impurities remained in the gas stream. After final compression, and in fractionation operations, the contaminants resulted in rapid fouling of fractionator reboilers, and in deactivating of adsorbents used for dehydration. When the initial fractionators and dehydrating units were thus rendered ineffective, the water vapor and the contaminants remained in the stream and resulted in formation of hydrates in subsequent fractionators operating at lower temperatures. Such hydrates cause plugging and frequent down-time.

OBJECTS OF INVENTION

The general object of the present process is to provide a new and improved method of separating a relatively concentrated ethylene stream from a cracked gas mixture. More specifically, an object of the invention is to remove certain components from the stream in higher degree than heretofore possible without increase in ethylene loss, or even with improved ethylene recovery. Even more specifically, an object of the invention is to remove tar forming and polymer forming components in an ethylene recovery process to a greater degree than heretofore feasible. A related object is to provide an improvement in an ethylene recovery operation which materially reduces interruptions and down-time. Still another object is to provide a process capable of a higher service factor but using less complicated processing operations. Other objects will appear hereinafter.

GENERAL DESCRIPTION OF INVENTION

The invention is based upon the discovery of a surprising reversal of vapor-liquid relationships and utilizes said phenomenon. It has now been found that, in crude ethylene containing mixtures of the type described, the vapor-liquid equilibria are singularly effective, at low pressures, for condensing out undesired higher molecular weight hydrocarbon impurities and water vapor, in contrast to the same operation at high pressures. By undesired higher molecular weight hydrocarbons is meant generally those hydrocarbons having a molecular weight of 70 or more. Also undesired are the above mentioned trace quantities of diolefins, e. g., butadiene and isoprene.

The improved process of the invention comprises compressing the crude gas to a moderate pressure level of about 100 to 300 pounds, and cooling the so-compressed gas and condensing at least about one-half of the pentane component, and separating the gas and liquid so-formed. The requirement of condensing one-half of the pentane may be alternatively stated as liquefying at least 70 percent of the pentane and heavier molecular weight hydrocarbons. However, the important index is the stated degree of reduction of pentane impurity in the gas phase. Not only does this assure removal of the objectionable aromatics, but provides concurrent reduction of the highly undesirable diolefins.

As mentioned, the benefits of the process are founded on the discovery of surprising reversal of the vapor-liquid equilibrium relationships in the pressure ranges employed in the process, as contrasted with the higher pressures normally employed. This reversal is illustrated most suitably by comparison of the vapor-liquid equilibrium constants for ethylene and pentane. The equilibrium constant, $K = Y/X$, where $Y$ = mole fraction of the component in the vapor phase, and $X$ = mole fraction in the liquid phase, presents a convenient guide for comparing the relative enrichment or stripping upon either vaporizing or condensing.

Considering the equilibrium constants for ethylene ($Ke$) and pentane ($Kp$), in systems of the type being processed, the ratio $Ke/Kp$ is about 45 at 500 pounds pressure, but at 300 pounds has increased to 130. At lower pressures, the ratio is even greater, rising to 155 at 200, and 200 at 100 pounds pressure. The discovery of this relationship explains the significant benefits of the present invention. Expressing these results conversely, pentane is much more easily liquefied from ethylene at lower pressures than at higher pressures customarily employed. In contrast the relative ratios of the constants for the other components such as propylene, propane, and ethane do not show this pronounced variation so that pressure does not alter the relative volatility characteristics.

Figure 2:
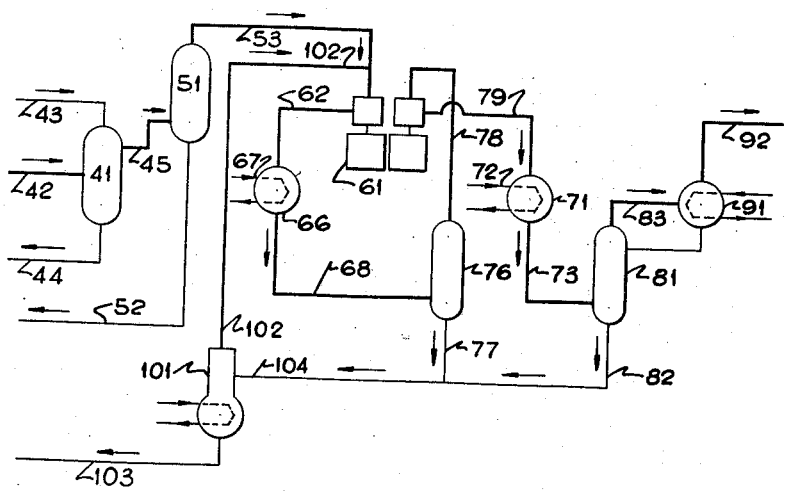

As will be apparent from the more detailed description hereafter and the examples, various further refinements are quite feasible to this process and the various embodiments will be readily understood from the accompanying figures, wherein:

Figure 1 is a schematic flow diagram showing the simplest form of the process, and Figure 2 is an additional schematic diagram which shows the process equipment and flows for a slightly more elaborate version of the process which provides additional benefits.

DETAILED EXAMPLE OF PRIOR ART

The benefits of the present process are more specifically presented by a contrast with a typical prior art operation of which the following example is typical.

An ethane stream including a number of other impurities in minor quantities, was cracked by passing through a cracking coil at a temperature of the order of 1450–1500° F. The effluent gas from the coil was passed through a water quench tower for rapid cooling. Upon completion of the quench and passage through a knockout drum, the gas was then fed to a compression system. The composition of this gas was as follows:

| | Mole fraction |
|---|---|
| Methane and lighter | 0.45 |
| Ethylene | .28 |
| Ethane | .08 |
| $C_3$–$C_4$ hydrocarbons | .13 |
| N-pentane, benzene, toluene, and trimethylbenzene | .04 |

This gas, after being quenched, also contained 0.02 mole fraction water vapor. The gas was fed at a suction pressure of about 35 pounds to a two-stage compressor, and at a temperature of about 90–100° F. The gas was compressed to a pressure of 180 pounds per square inch gauge in the first stage and was then passed through an intercooler for removing the heat of compression, the temperature being reduced to only about 100° F. This cooling resulted in the formation of a small amount of liquid condensate, this including substantially no ethylene and no pentane. The liquid condensate was withdrawn from the system and utilized for fuel value, as waste hydrocarbon material. The gas then passed to the second stage of the compressor for compression to a pressure of approximately 600 pounds per square inch gauge and at this point was again passed through a heat exchanger for removal of the heat of compression only, and was cooled to approximately 100° F. The gas was then passed through a final knock-out drum before passing to a fractionator. The gas at this point contained substantially all the ethylene fed and the heavier fraction of components including normal pentane and the less volatile or heavier aromatic components in the proportions of about 7 moles per 100 moles of ethylene. It is thus seen that the former process resulted in a decrease in these undesirable higher molecular weight fraction of about 50 percent. The amount of water in the stream was reduced by the above described compression and intercooling operation to approximately 2.5 moles per 100 moles of ethylene content. This concentration thus represents a reduction to about one-third of the water vapor.

The compressed gas was fractionated, the $C_4$ and heavier hydrocarbons being concentrated in the column bottoms. The overhead gas, containing appreciable quantities of water vapor, were passed through dehydrator drums, these being drums packed with activated alumina for cyclic adsorption of the water vapor. In past operations, the dehydrators effectively removed substantially all the water present as long as the adsorbent alumina was active and uncontaminated by condensed organic liquid. However, because of fouling, the fractionator efficiency rapidly decreased and appreciable pentane-plus fraction, as well as four carbon atom unsaturates, appeared in the overhead. On passing such an overhead gas stream through the dehydrators, the polymerizable unsaturates and aromatics rapidly condensed in the adsorbent pores, thus preventing effective water vapor removal. The water vapor passed through with the gas and upon being fed to subsequent fractionation equipment which utilized low temperature refrigerants, resulted in the formation of hydrates in the upper portion of such fractionation columns and in the condensers.

Although the liquid condensate from the interstage coolers and knock-out vessels did not contain any appreciable amount of ethylene, the fractionator following the compressor separated a bottom stream containing ethylene in the proportions of approximately 1.5 percent of the ethylene in the original feed stream. This quantity was a direct loss, in addition to the operating interruptions above described.

The simplest form of the present process is described in the subsequent Example I.

Example I

The sequence of operations in the simplest form of the improved process is illustrated most directly by reference to Figure 1. Referring to Figure 1, the apparatus there diagrammed is substantially the same as employed in the previous operations. The principal units include a quench tower 11, a disengaging tower 12, a two-stage compressor 13, an intercooler heat exchanger 14, a separatory drum for the first stage compressed gas 15, an after cooler 16 for cooling the gas from the final stage of the compressor 13, and a final disengaging drum 17. The feed gas from the cracking furnace is fed through line 21 to the quench tower 11 wherein cold water is sprayed from feed line 23 and intimately contacts the gas, the water, except for the portion vaporized, being discharged to the bottoms line 22. The cooled or quenched gas then leaves the quench tower 11 through line 24 and passes upwardly through the disengaging column 12 which is fitted with a plurality of baffles to secure as much separation of droplets of entrained water as feasible. The disengaged liquid is collected at the bottom of the disengaging tower 12 and discharged through the line 25. The overhead gas leaves through line 26 and passes to the initial stage of the compressor 13 and upon being compressed passes through a line 27 to a shell and tube intercooler 14. The gas after being cooled in the intercooler 14 then goes through line 28 to the disengaging drum 15, where a small amount of condensed liquid material is knocked out and removed through the bottoms line 29. The gas overhead from the disengaging drum 15 passes through line 30 to the final stage of the compressor, wherein it is compressed to a pressure level of approximately 600 pounds per square inch gauge, and is then discharged through line 31 which feeds the compressed gas to the after cooler 16. The after cooler cools the gas to a temperature of approximately 100° F. and the cooled gas is discharged through line 32 to the final disengaging drum 17 wherein an additional small amount of liquid is disengaged and removed through the bottoms line 33. The overhead gas from the final disengaging drum 17 goes through line 34 to a subsequent fractionator, not shown.

In a typical operation employing the improved method, and using a feed gas from the furnace of the same composition as already described, the degree of cooling accomplished in the intercooler 14 is increased to the extent that over one-half (54 percent) of the pentane present is liquefied. This is accomplished by cooling to a temperature of about 65° F. The liquid hydrocarbons formed are disengaged in the drum 15 and withdrawn through line 29. The gas from the disengaging drum 15 then passes through line 30 for compression in the second stage of the compressor 13 to a pressure of about 550–600 p. s. i. g. After passing through the after cooler 16 with some additional minor amount of condensation and then disengaging in the knock-out drum 17, the gas goes through the dehydrator and a dried stream is delivered through line 35 to subsequent operations consisting of a plurality of fractionations to arrive at a relatively concentrated ethylene stream. The composition of the compressed gas leaving the dehydrator 18 through line 35 is very similar with respect to ethylene concentration as is the initial compressor feed. However, owing to the very slight decrease in temperature in the intercooler 14, following the initial compression stage, a very marked benefit is realized with respect to the contaminants responsible for serious deficiencies in the subsequent fractionations. In particular, the ratio of the pentane and higher hydrocarbons to the ethylene present is reduced from about 14 moles per 100 to about 3 moles per 100, or a reduction in these impurities of about 80 percent. The continuous operating time possible, by contrast with the former method, is approximately doubled. In addition to the improvement with respect to decrease of the higher hydrocarbons contaminants, the above described process results in a decrease in the proportions of water vapor present of 2.5 moles of ethylene to about one-half of a mole or a decrease of about 80 percent. From this result is is apparent that an operating cycle of approximately two times as long on the dehydrators could be employed.

The foregoing example shows the improvements obtained by liquefying the pentane component in the indicated degree at the low pressure. It is seen that the present process allows doubling the continuous run time. The foregoing example or embodiment of the invention does result in a very slight increase in ethylene loss at this point in the operation, but this loss is compensated for by improved subsequent fractionation operations and economically by the improvement in absence of interruptions.

A more refined form of the embodiment providing improved recovery is described in the following example and illustrated by Figure 2.

*Example II*

A further improved form of the process involves the same step of cooling the partially compressed gas as described in the foregoing Example I and, in addition to isolating the liquid phase thereby formed, subjecting it to a flash vaporization again at temperature-pressure relationships which are integrated with the other conditions in the process and are peculiar to the particular chemical system being processed. The flash vaporization described produces a relatively moderate amount of vapor phase, in comparison with the total gaseous feed stream to be segregated. This vapor stream is separated from the flash vaporizing operation and returned and combined with the fresh crude feed to be fed to the first stage of the compressor.

The layout of a plant for utilizing the embodiment of the present example is illustrated schematically by Figure 2. Referring to Figure 2, the apparatus units are very similar to those shown in the foregoing example and in Figure 1. The principal apparatus units include a quench tower 41, a disengaging tower 51, a two-stage compressor 61, an intercooler heat exchanger 66, and an after cooler 71. These exchangers are followed or accompanied by knockout drums 76 and 81, and a flash drum 101.

The flows of material are quite similar to the flows in Example I with the variations noted hereafter. The feed stream from a cracking furnace is fed through a feed line 42 to the quench tower 41, wherein it is contacted with cool water sprayed therein, the water being fed through a line 43. The water is collected and discharged at the bottom through line 44. The quenched gas from the quench tower 41 is passed through line 45 to the disengaging tower 51. A small amount of entrained water vapor and high boiling aromatic constituents are removed and collected at the bottom of the tower 51 for discharge through line 52. The overhead gas from the disengaging tower passes through a transfer line 53 to the first stage of the compressor 61. The compressed gas from the first stage is discharged through the low pressure line 62 to the intercooler 66. Coolant is supplied through line 67 to the intercooler 66 for cooling of the compressed gas. The cooled gas from the intercooler 66 passes through the transfer line 68 to a knock-out drum 76. The knock-out drum collects the liquid phase formed by the cooling operation and discharges said liquid through a bottoms line 77. The overhead gas, freed of liquid components, is discharged from the knock-out drum 76 through line 78 to the high stage intake of the compressor 61, and after compression to a level of the order of 500–600 pounds is transferred through line 79 to the after cooler 71 which is supplied with cooling material through a refrigerant line 72. The cooled gas from the after cooler passes through a line 73 to the final knock-out drum 81. As in the interstage knock-out drum, the present knock-out drum 81 is provided to collect the liquid phase formed, if any, at the bottom and to discharge it through line 82, which may be manifolded or connected to the line 77 which transfers the liquid from the first interstage knock-out drum 76.

The overhead gas from the final knock-out drum 81 is transferred through a line 83 to a subsequent fractionator.

As previously mentioned, a significant feature of the present embodiment is the supplemental processing of the liquid collected from the process stream after passage through the intermediate stage cooler and disengaging thereof from the gaseous components. This liquid, collected from the knock-out drum 76 is passed through line 77 to the flash drum 101. Here the liquid stream is subjected to sufficient heat to vaporize a moderate amount of gaseous components, which are discharged through an overhead line 102. This line joins or is connected to the main feed line 53 for introducing quenched and dephlegmated gas to the low stage of the compressor 61. The liquid remaining after the material has been exposed to the flash operation in flash drum 101 is discharged from a bottoms line 103.

To illustrate more specifically the operation of this embodiment, a feed stream corresponding exactly to the feed stream employed in Example I is introduced to the system through line 53, after being passed through the quench tower 41 and the dephlegmating tower 51. The recycle gas from the flash drum 101, is combined with this stream, fed through line 102 and fed to the low stage compressor intake of the compressor 61. The composition of the feed stream, and of the combined stream is tabulated below:

|  | Quenched Feed Gas | Combined Feed to Compressor |
|---|---|---|
| Methane and lighter | 0.45 | 0.44 |
| Ethylene | .28 | .28 |
| Ethane | .08 | .08 |
| C$_3$-C$_4$ hydrocarbons | .13 | .14 |
| Pentane and heavier | .04 | .04 |
| Water | .02 | .02 |
| Rate (Basis 100 moles feed gas)......moles.. | 100 | 102.5 |

The combined feed, at a moderate pressure which is at about 40 pounds pressure or less, and a temperature of, generally 50 to 60° F. is then fed to the suction intake of the low pressure stage of the two-stage compressor 61. In compressing through two balanced stages to obtain the desired final compressed pressure of about 600 pounds, the low stage discharge pressure is in the range of 170–185; in the present instance, about 180–181 pounds. The compressed gas is then passed through line 62 to the intercooler 66, and cooled therein to a temperature of about 65° F. This cooling provides condensation of a portion of the gas, the liquid including a large fraction of the pentane-and-heavier hydrocarbon components and also of the water vapor. The cooled gas-liquid stream is passed through a line 68 to the disengaging drum 76, where the liquid phase is collected and discharged through the bottoms line 77, the non-condensed gas being discharged through an overhead line 78. The effectiveness of the above cooling and separation steps is shown by the following stream composition:

|  | Liquid From Disengaging Drum | Vapor From Disengaging Drum |
|---|---|---|
| Methane and lighter | 0.05 | 0.43 |
| Ethylene | .07 | .30 |
| Ethane | .03 | .08 |
| C$_3$-C$_4$ | .15 | .13 |
| Pentane and heavier | .43 | .01 |
| Water | .27 | .0015 |
| Moles | 7.6 | 95.4 |

The gas overhead from the disengaging drum 78 for the low pressure gas is then compressed in the second stage of the two-stage compressor 61 to a pressure of over 500 pounds; in this instance, 585 pounds. The compressed gas then passes through the high pressure discharge line 79 to an after cooler 71 where it is cooled to a temperature of about 100° F. The cooled gas is then fed through a line 73 to a final disengaging drum 81. The overhead gas from this unit is further cooled in a cooler 91 to a temperature of about 75° F. and this cooling results in some small amount of additional condensate, which is collected in the bottom of the disengaging drum 81. Compositions and quantities of the gas leaving the final cooler through a transfer line 92, and of the liquid collected at the bottom of the disengaging drum 81, are given below:

|  | Liquid From Disengaging Drum | Vapor From Disengaging Drum |
|---|---|---|
| Methane and lighter | 0.16 | 0.48 |
| Ethylene | .19 | .30 |
| Ethane | .08 | .08 |
| C$_3$-C$_4$ | .33 | .12 |
| Pentane and heavier | .20 | less than .01 |
| Water | .05 | .001 |
| Moles | 1.5 | 93.6 |

It is readily seen that the gas delivered from the process and transferred to subsequent fractionations, for further concentration of the ethylene, is virtually free of water vapor and has less than one percent of the pentane and heavier hydrocarbons.

To provide a very high recovery of ethylene, the liquid streams collected from both the low pressure disengaging drum 76 and the high pressure disengaging drum 81 are combined and fed through a line 104 to a flash drum 101. The flash drum vaporizes a gaseous fraction from these two liquid streams, amounting to about 2.5 moles to 100 moles of feed gas, and containing about 26 mole percent ethylene.

For facilitating comparison of the several described embodiments of the process and for contrast with the former method, the results are summarized in the following table:

| Operation | Former Method (cool gas from low compression without appreciable condensation) | Example I (cool gas from low compression to condense ½ pentane) | Example II (cool gas from low compression to condense ½ pentane, flash condensate at compressor intake pressure and recycle gas) | |
|---|---|---|---|---|
| | | | (gas from low pressure disengager 76) | (overhead gas 92 from final disengager) |
| Component ratios: | | | | |
|   Pentane-plus/Ethylene | 0.069 | 0.031 | 0.030 | 0.022 |
|   Water/Ethylene | 0.024 | 0.005 | 0.005 | 0.003 |
| Recovery—ethylene | 98+ | 98+ | 99+ | 99+ |
| Increase in Continuous run time | | 2.2 | 2.3 | 3.1 |
| Increase in Removal Efficiency: | | | | |
|   Pentane-plus............percent.. | | 21 | | 28 |
|   Water.....................do.... | | 27 | | 30 |

From the foregoing, it is seen that separating by the simplest form of my process (Example I), the continuous run time of a plant is increased by at least twofold. If further simple steps are provided, as in Example II, the continuous run time of a plant is increased by a factor of 3, or an increase in performance of 200 percent with respect to eliminating undesired interruptions. In addition, the recovery of the ethylene is improved, and a subsequent fractionator is rendered unnecessary.

VARIABLES

The principles of the process can be utilized with a high degree of effectiveness with considerable variation in feed stream compositions, and with substantial variation in the conditions of operation. Generally, of course, the benefits are derived uniformly when the crude ethylene stream is derived from petroleum cracking operations. Such streams uniformly contain, in varying quantities, the contaminants associated with pentane and heavier components.

Generally, the pressure and temperature of the low pressure condensation, which is the essential feature of the process is affected by several factors. These include the desired ultimate pressure for the system, and the number of stages which are most economic for raising the stream to that pressure. It is usually desired that the gas stream transferred to the subsequent fractionating towers should be at a pressure of the order of 550 to 600 pounds. If the compression is to be carried out in a two-stage coupled compressor, the low pressure stage will deliver gas at about 170–190 pounds pressure. On the other hand, if a three-stage compressor is used, the discharge pressure from the first stage is about 75 pounds, and about 240 from the second stage. The benefits of my process are obtained in good degree from 100 to 300 pounds pressure, but above 200 pounds pressure the degree of improvement is slightly less. In addition to this preferred upper pressure of 200 pounds, it is highly desirable that the pressure should not be less than about 100 pounds, this range being desirable to permit the use of ordinary cooling water as the coolant.

As previously described, the particular virtue of the process is the surprising degree of removal of undesired contaminants with no appreciable increase in ethylene loss. The last trace of pentane need not be condensed, however, and in fact, to liquefy the last micro-traces of the pentane-plus fraction would require liquefication of the entire stream. The advantages of the process are preserved up to a condensation of about three-fourths of the pentane component. This preferred range of condensing from about one-half to about three-fourths of the pentane assures the benefits of the process with respect to increasing continuous run time without substantial increase in the ethylene condensed.

Having described in full detail the process of my invention and the most effective manner of its operation, what I claim is:

A method for recovering a concentrated ethylene from a gaseous, water-quenched cracked hydrocarbon feed containing appreciable pentane impurity and associated polymerizable contaminants and aromatic hydrocarbons and derived from cracking a normally gaseous feed stream, said method being characterized by the steps of compressing the water-quenched gaseous material to a pressure of from 100 to 200 pounds per square inch gauge, cooling the compressed material at that pressure by indirect heat exchange to a temperature of from 50 to 70° F., so as to condense out from about half to three fourths of the pentane, and a major part of the water vapor present in the cooled gas, disengaging the cooled gas from the condensate, compressing the thus separated gas to a pressure of from 500 to 600 pounds per square inch gauge immediately following the disengagement, and then subjecting the gas at the last-mentioned pressure to a dehydration operation.

References Cited in the file of this patent

UNITED STATES PATENTS

| | | |
|---|---|---|
| 1,266,621 | Peterson | May 21, 1918 |
| 2,113,588 | Greenewalt | Apr. 12, 1938 |
| 2,222,275 | Babcock | Nov. 19, 1940 |
| 2,258,749 | Eaton | Oct. 14, 1941 |
| 2,274,094 | Rupp | Feb. 24, 1942 |
| 2,469,724 | Gross | May 10, 1949 |
| 2,471,602 | Arnold | May 31, 1949 |
| 2,514,294 | Rupp | July 4, 1950 |
| 2,519,344 | Berg | Aug. 22, 1950 |
| 2,573,341 | Kniel | Oct. 30, 1951 |
| 2,663,669 | Barnes | Dec. 22, 1953 |

U. S. DEPARTMENT OF COMMERCE

PATENT OFFICE

CERTIFICATE OF CORRECTION

Patent No. 2,817,961                         December 31, 1957

Harry E. O'Connell

It is hereby certified that error appears in the printed specification of the above numbered patent requiring correction and that the said Letters Patent should read as corrected below.

Column 5, line 75, after "moles" insert --per 100 moles--; column 6, line 1, for "is", first occurrence, read --it--.

Signed and sealed this 1st day of April 1958.

(SEAL)
Attest:
KARL H. AXLINE

Attesting Officer

ROBERT C. WATSON
Commissioner of Patents